US010706504B2

(12) United States Patent
Liu et al.

(10) Patent No.: US 10,706,504 B2
(45) Date of Patent: Jul. 7, 2020

(54) IMAGE PROCESSING METHODS AND IMAGE PROCESSING DEVICES

(71) Applicant: BOE Technology Group Co., Ltd., Beijing (CN)

(72) Inventors: Hanwen Liu, Beijing (CN); Pablo Navarrete Michelini, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 239 days.

(21) Appl. No.: 15/921,961

(22) Filed: Mar. 15, 2018

(65) Prior Publication Data
US 2019/0139191 A1  May 9, 2019

(30) Foreign Application Priority Data

Nov. 9, 2017  (CN) .......................... 2017 1 1099988

(51) Int. Cl.
G06K 9/62 (2006.01)
G06T 3/40 (2006.01)
G06T 5/10 (2006.01)
G06T 5/00 (2006.01)
G06N 3/02 (2006.01)

(52) U.S. Cl.
CPC .......... G06T 3/4046 (2013.01); G06K 9/6259 (2013.01); G06N 3/02 (2013.01); G06T 5/002 (2013.01); G06T 5/10 (2013.01); G06T 2207/20048 (2013.01); G06T 2207/20081 (2013.01); G06T 2207/20084 (2013.01)

(58) Field of Classification Search
CPC .... G06N 3/02; G05B 13/028; G05B 19/4183; G05B 19/4184; G05B 19/41845

USPC ........................................................ 382/157
See application file for complete search history.

(56) References Cited

U.S. PATENT DOCUMENTS 10,198,624 B2 *  2/2019  Li ...................... G06K 9/00281
10,402,722 B2 *  9/2019  Rippel .................... G06T 5/002

FOREIGN PATENT DOCUMENTS

| CN | 106651766 A | 5/2017 |
| CN | 106778928 A | 5/2017 |
| CN | 107122826 A | 9/2017 |
| CN | 107171932 A | 9/2017 |
| CN | 107277391 A | 10/2017 |
| CN | 107330852 A | 11/2017 |

OTHER PUBLICATIONS

Zhu Jun-Yan et al., "Unpaired Image-to-Image Translation using Cycle-Consistent Adversarial Networks," Berkeley AI Research (BAIR) laboratory, UC Berkeley, arXiv:1703.10593v4 [cs.CV], Feb. 19, 2018, 20 pages.

(Continued)

Primary Examiner — Charlotte M Baker
(74) Attorney, Agent, or Firm — Westman, Champlin & Koehler, P.A.

(57) ABSTRACT

The embodiments of the present disclosure provide an image processing method, and a processing device. The image processing method comprises: acquiring a first image including N components, where N is a positive integer greater than or equal to 1; and performing image conversion processing on the first image using a generative neural network, to output a first output image, wherein the generative neural network is trained using a Laplace transform function.

14 Claims, 10 Drawing Sheets

First loss calculation unit

(56) References Cited

OTHER PUBLICATIONS

Johnson Justin et al., "Perceptual Losses for Real-Time Style Transfer and Super-Resolution," Department of Computer Science, Stanford University, arXiv:1603.08155v1 [cs.Cv], Mar. 27, 2016, 18 pages.
Gatys Leon A., et al., "A Neural Algorithm of Artistic Style," Werner Reichardt Centre for Integrative Neuroscience and Institute of Theoretical Physics, arXiv:1508.06576v2 [cs.CV], Sep. 2, 2015, 16 pages.
First Office Action, including Search Report, for Chinese Patent Application No. 201711099988.1, dated May 17, 2019, 17 pages.
Li, Shaohua et al., "Laplacian-Steered Neural Style Transfer", School of Computing, National University of Singapore, Institute of High Performance Computing, Singapore, Shandong University, arXiv:1707.01253v2 [cs.CV], Jul. 30, 2017, 9 pages.

* cited by examiner

IMAGE PROCESSING METHODS AND IMAGE PROCESSING DEVICES

CROSS-REFERENCE TO RELATED APPLICATION(S)

This application claims priority to the Chinese Patent Application CN201711099988.1, filed on Nov. 9, 2017, which is incorporated herein by reference in its entirety.

TECHNICAL FIELD

The present disclosure relates to image processing, and more particularly, to an image processing method and an image processing device.

BACKGROUND

There is a technology of using deep neural networks for image processing and conversion, which has emerged as the deep learning technology evolves. However, the conventional image processing and conversion system has a complicated structure, is difficult to train, and has an output image which lacks diversity.

SUMMARY

The present disclosure provides an image processing method and an image processing device.

The embodiments of the present disclosure provide an image processing method, comprising:
acquiring a first image including N components, where N is an integer greater than or equal to 1; and
performing image conversion processing on the first image using a generative neural network, to output a first output image, wherein the generative neural network is trained using a Laplace transform function.

According to an embodiment of the present disclosure, performing image conversion processing on the first image using a generative neural network comprises: performing image conversion processing on the first image using the generative neural network based on an input image including the first image and a first noise image.

According to an embodiment of the present disclosure, the first noise image comprises M components, where M is an integer greater than or equal to 1.

According to an embodiment of the present disclosure, the generative neural network comprises one or more down-scale units, one or more residual units and one or more up-scale units, wherein
the down-scale units each comprise a convolutional layer, a down-scale layer and an instance normalization layer which are sequentially connected; the residual units each comprise a convolutional layer and an instance normalization layer which are sequentially connected; and the up-scale units each comprise an up-scale layer, an instance normalization layer and a convolutional layer which are sequentially connected, wherein the number of the up-scale units is equal to the number of the down-scale units.

According to an embodiment of the present disclosure, the input image is used as a first training image, the first noise image is used as a first training noise image, and the image processing method further comprises: acquiring a second training image including information of a second training noise image and the first image, wherein the second training noise image is different from the first training noise image; performing image conversion processing on the second training image using the generative neural network to output a second output image; and training the generative neural network based on the first image, the first output image and the second output image.

According to an embodiment of the present disclosure, training the generative neural network comprises: inputting the first output image to a discriminative neural network to output a discrimination label indicating whether the first output image has converted features; and calculating a loss value of the generative neural network according to the first image, the first output image, the second output image and the discrimination label to optimize parameters of the generative neural network.

According to an embodiment of the present disclosure, calculating a loss value of the generative neural network comprises: obtaining style features of the first output image and the second output image; obtaining Laplace transformed images of the first image, the first output image and the second output image; calculating, in accordance with a first loss function, the loss value of the generative neural network according to the obtained style features, the obtained Laplace transformed images and the discrimination label of the first output image; and optimizing the parameters of the generative neural network according to the loss value of the generative neural network.

According to an embodiment of the present disclosure, the first loss function comprises a Laplace transform function, and calculating the loss value of the generative neural network comprises: calculating, in accordance with the Laplace transform function, a Laplace transform loss value of the generative neural network according to the Laplace transformed images of the first image, the first output image and the second output image; and the first loss function further comprises a style loss function, and calculating the loss value of the generative neural network comprises: calculating, in accordance with the style loss function, a style loss value of the generative neural network according to the style features of the first output image and the style features of the second output image.

The embodiments of the present disclosure further provide an image processing device, comprising: one or more processors; and one or more memories connected to the one or more processors and having computer readable codes stored thereon, which when being executed by the one or more processors, cause the one or more processors to be configured to: perform image conversion processing on a first image including N components using a generative neural network, to output a first output image, where N is an integer greater than or equal to 1, wherein the generative neural network is trained using a Laplace transform function; and wherein performing image conversion processing on the first image using a generative neural network comprises: performing image conversion processing on the first image using the generative neural network based on an input image including the first image and a first noise image, wherein the first noise image comprises M components, where M is an integer greater than or equal to 1.

According to an embodiment of the present disclosure, the generative neural network comprises one or more down-scale units, one or more residual units and one or more up-scale units, wherein the down-scale units each comprise a convolutional layer, a down-scale layer and an instance normalization layer which are sequentially connected; the residual units each comprise a convolutional layer and an instance normalization layer which are sequentially connected; and the up-scale units each comprise an up-scale layer, an instance normalization layer and a convolutional layer which are sequentially connected, wherein the number of the up-scale units is equal to the number of the down-scale units.

According to an embodiment of the present disclosure, the processors are further configured to: train the generative neural network according to the first output image from the generative neural network, wherein the input image is used as a first training image, and the first noise image is used as a first training noise image, the generative neural network further performs image conversion processing on a second training image including information of a second training noise image and the first image to output a second output image, wherein the second training noise image is different from the first training noise image; and the processors are further configured to train the generative neural network based on the first image, the first output image and the second output image.

According to an embodiment of the present disclosure, the processors are further configured to: output a discrimination label indicating whether the first output image has converted features; and calculate a loss value of the generative neural network according to the first image, the first output image, the second output image and the discrimination label to optimize parameters of the generative neural network, wherein optimizing the parameters of the generative neural network comprises: obtaining style features of the first output image and the second output image; obtaining Laplace transformed images of the first image, the first output image and the second output image; calculating, in accordance with a first loss function, the loss value of the generative neural network according to the obtained style features, the obtained Laplace transformed images and the discrimination label of the first output image; and optimizing the parameters of the generative neural network according to the loss value of the generative neural network.

According to an embodiment of the present disclosure, the first loss function further comprises a style loss function for calculating a style loss value of the generative neural network according to the style features of the first output image and the style features of the second output image, and the first loss function further comprises a Laplace transform function for calculating a Laplace transform loss value of the generative neural network according to the Laplace transformed images of the first image, the first output image and the second output image.

DETAILED DESCRIPTION

The technical solutions in the embodiments of the present disclosure are clearly and completely described below with reference to the accompanying drawings in the embodiments of the present disclosure. Obviously, the described embodiments are merely a part of the embodiments of the present disclosure, rather than all the embodiments. All other embodiments obtained by those of ordinary skill in the art based on the embodiments of the present disclosure without creative efforts shall fall within the protection scope of the present disclosure.

Figure 1:
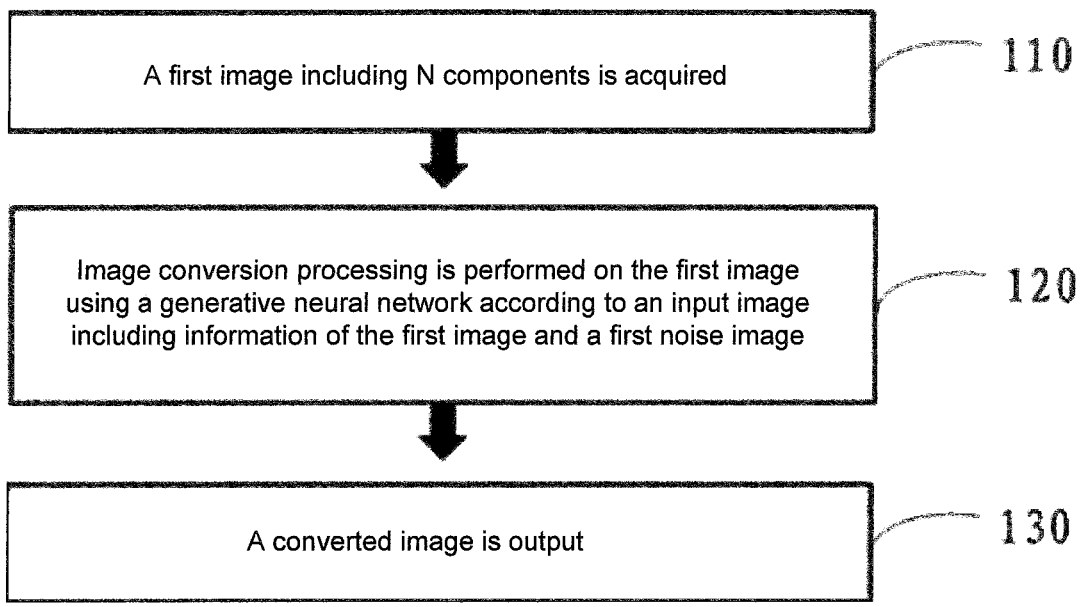
FIG. 1 illustrates a flowchart of an image processing method according to an embodiment of the present disclosure.

The embodiments of the present disclosure provide an image processing method, an image processing apparatus, and an image processing device, for implementing image conversion, and performing image processing using a group of generative neural networks. An input image of the generative neural network not only comprises an image to be converted but also comprises a noise image for generating image related detail information. When image processing is performed multiple times according to the same image to be converted using the generative neural network, converted images having different detail information are generated due to different noise images, so that output images have a diversity of results. Based thereon, the generative neural network is trained based on a discrimination label of a discriminative neural network, and Laplace transformed results of the image to be converted and the output image to ensure that the output image is consistent with the input image, and the generative neural network is trained based on a style feature loss between different output images to ensure that the output images have diversity. There is no need to use another group of adversarial networks having cyclic consistency to train the generative neural network, which makes the system simple and the training fast A flowchart of the image processing method according to the embodiments of the present disclosure is shown in FIG. 1. The image processing method comprises step S110, in which a first image including N components is acquired, where N is an integer greater than or equal to 1. In the embodiments of the present disclosure, N may be, for example, 3, and the first image may comprises a first color component, a second color component and a third color component. In the embodiments of the present disclosure, the first image comprises three components which are RGB components. In step S120, image conversion is performed on the first image using a generative neural network according to an input image including information of the first image and a first noise image, to output a first output image. The image conversion processing may be converting an input image having an effect A into an output image having an effect B, so that the output image not only comprises features in the input image but also comprises features of the effect B, for example, image style, scene, season, effect or other features based image conversion. In step S130, the output image subjected to the image conversion processing is output.

Figure 2:
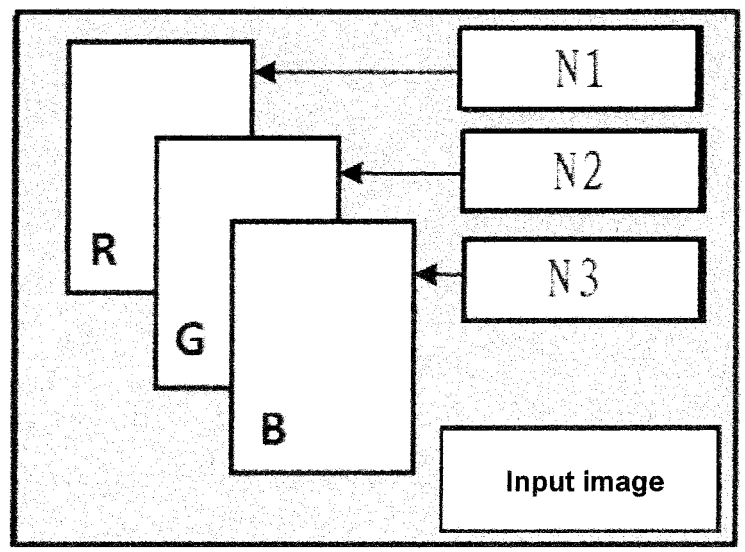
FIG. 2 illustrates a diagram of acquiring an input image in the image processing method in FIG. 1.

In order to enable diversity of the image converted results, the input image comprises a first noise image for generating image related detail information, wherein the first noise image comprises M components, where M is an integer greater than or equal to 1, and various components of the first noise image are different from each other. For example, in the embodiments of the present disclosure, M is 3, and the three components of the first noise image are added to the RGB components of the first image, respectively to obtain the input image. A diagram of the above acquisition process is shown in FIG. 2, which comprises: acquiring a first image having three components which are RGB components; acquiring a first noise image, which is a noise image N1, a noise image N2, and a noise image N3 in the embodiments of the present disclosure; adding the noise images N1, N2, and N3 to the three components of the first image, respectively, to generate an input image including three components, wherein the noise images N1, N2, and N3 have random noises which are different from each other. The random noises may be, for example, Gaussian noises. In other embodiments of the present disclosure, M may also be 1, in which case the random noise is directly input to the generative neural network together with the first image, for generating detail information during the image conversion processing, which will not be described in detail in the specification.

Figure 3:
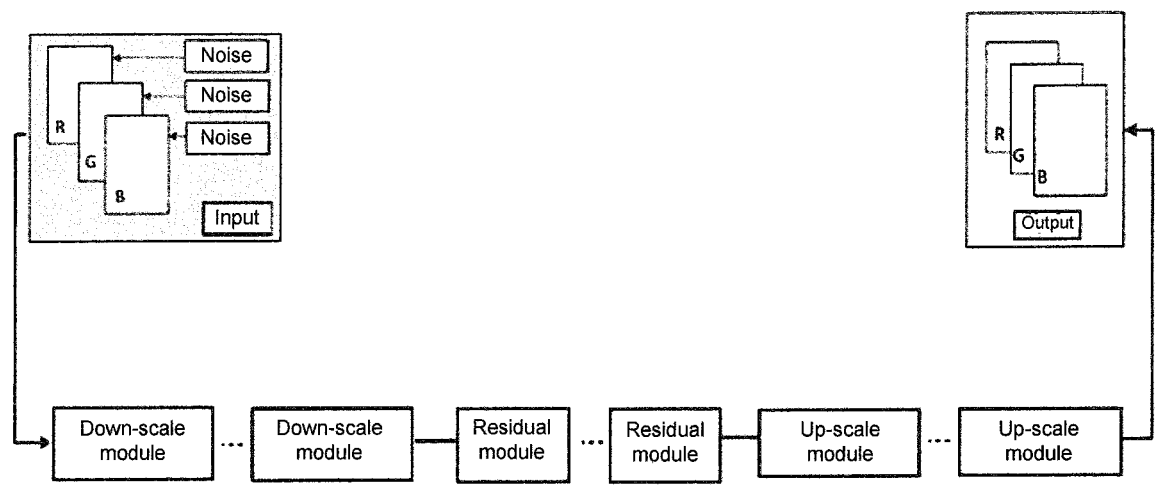
FIG. 3 illustrates a structural diagram of a generative neural network in FIG. 1.

FIG. 3 illustrates a structural diagram of a generative neural network for implementing the above image processing method. The generative neural network comprises one or more down-scale units, one or more residual units and one or more up-scale units. A depth of the generative neural network is determined by the number of the down-scale units, the residual units and the up-scale units, which is determined according to a specific conversion application. In addition, the number of the down-scale units should be the same as that of the up-scale units, to ensure that the output image has the same image size as that of the input image.

The down-scale units each are configured to perform convolution processing on the input image and the noise image to extract image features and reduce a size of a feature image. The residual units each further perform convolution processing on the feature image output by the down-scale units without changing the size of the feature image. The up-scale units each are configured to amplify and normalize the feature image output by the residual units, to output an image which is obtained after the feature conversion. Converted features of the image are determined by parameters of the generative neural network. According to the conversion application, the generative neural network is trained by using a training image to optimize the parameters for conversion purposes. The parameters may comprise convolution kernels and biases of convolutional layers in the generative neural network. The image conversion application may be conversion of an image style, a season, an effect, a scene, etc., for example, converting a landscape image into an image with Van Gogh's artwork features, converting an image with summer features into an image with winter features, converting an image with a brown horse into an image with zebra's features, or even converting a cat into a dog.

Figure 4:
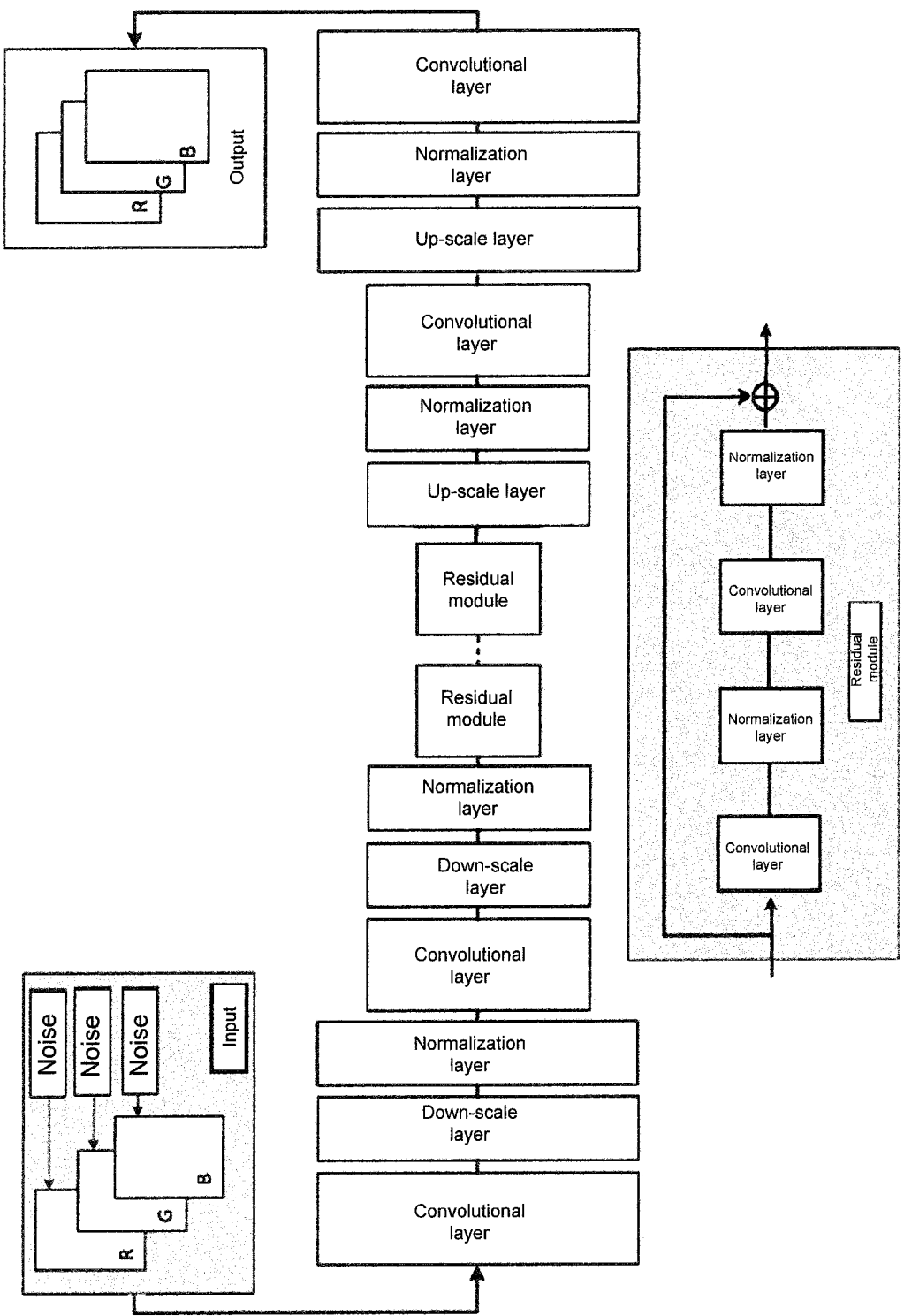
FIG. 4 illustrates a specific structural diagram of the generative neural network in FIG. 3.

FIG. 4 illustrates a specific structural diagram of the generative neural network in FIG. 3. The generative neural network according to the embodiments of the present disclosure will be described in detail below in conjunction with FIGS. 3 and 4. As shown in FIG. 4, the down-scale units each comprise a convolutional layer, a down-scale layer and an instance normalization layer which are sequentially connected.

In the convolutional layer, a neuron is only connected to neurons in a part of adjacent layers. The convolutional layer may apply a number of convolution kernels to the input image to extract various types of features. Each convolution kernel may extract one type of features. During training of the generative neural network, reasonable weights are reached for the convolution kernels through learning. A result obtained by applying a convolution kernel to the input image is referred to as a feature image, and the number of feature images is the same as that of the convolution kernels. Each feature image is composed of a number of neurons which are arranged in a rectangle, and neurons of the same feature image share a weight, that is, a convolution kernel. Feature images output by one convolutional layer may be processed by a next convolutional layer to obtain new feature images. For example, the input image may be processed by one convolutional layer to obtain content features thereof, which may be processed by a next convolutional layer to obtain style features.

The down-scale layer (which may be, for example, a pooling layer) may down-sample the images, which may reduce a size of the feature images without changing the number of the feature images, and perform feature compression on the images, to extract main features. In addition, the down-scale layers each may reduce a scale of the feature images to simplify the computational complexity and reduce the over-fitting phenomenon to a certain extent.

The instance normalization layer is configured to normalize feature images output by a previous layer. In the embodiments of the present disclosure, normalization is performed according to a mean and a variance of each feature image. Assuming that the number of selected mini-batches is T and the number of features output by a certain convolutional layer is C, and each feature image is a matrix of H rows and W columns, the feature images are represented as (T,C,W, H), and a normalization formula is as follows:

$$y_{tijk} = \frac{x_{tijk} - \mu_{ti}}{\sqrt{\sigma_{ti}^2 + \varepsilon}}, \mu_{ti} = \frac{1}{HW}\sum_{l=1}^{W}\sum_{m=1}^{H} x_{tilm}, \text{ and}$$

$$\sigma_{ti}^2 = \frac{1}{HW}\sum_{l=1}^{W}\sum_{m=1}^{H}(x_{tilm} - m\mu_{ti})^2$$

where $x_{tijk}$ is a value of mini-batch of t, feature image of i, column of j and row of k in a set of feature images output by a certain convolutional layer. $y_{tijk}$ represents a result obtained from processing by an instance normalization layer, and ε is a small integer value, to avoid a denominator from being 0.

As shown in FIG. 4, the residual units each not only comprise a convolutional layer and an instance normalization layer, but also comprise a skip connection, so that the residual unit have two parts, one of which is a processing part having the convolutional layer and the instance normalization layer and the other of which is a skip part which does not process an input image, and the skip connection directly adds an input to the residual unit to an output from the processing part. The Introduction of the skip connection in the residual unit can provide greater flexibility to the generative neural network. After the training of the generative neural network is completed, a degree of influence of the processing part and the skip part of the residual unit on the image processed result may be judged during system deployment. According to the degree of influence, a structure of the generative neural network may be tailored to improve operation efficiency and a processing speed of the network. For example, if it is judged that the influence of the skip connection part on the image processed result is much greater than that of the processing part, only the skip part in the residual unit may be used in the image processing by using the generative neural network to improve the processing efficiency of the network.

As shown in FIG. 4, the up-scale units each comprise an up-scale layer, an instance normalization layer and a convolutional layer which are sequentially connected to extract features of input images and normalize feature images.

Figure 5:
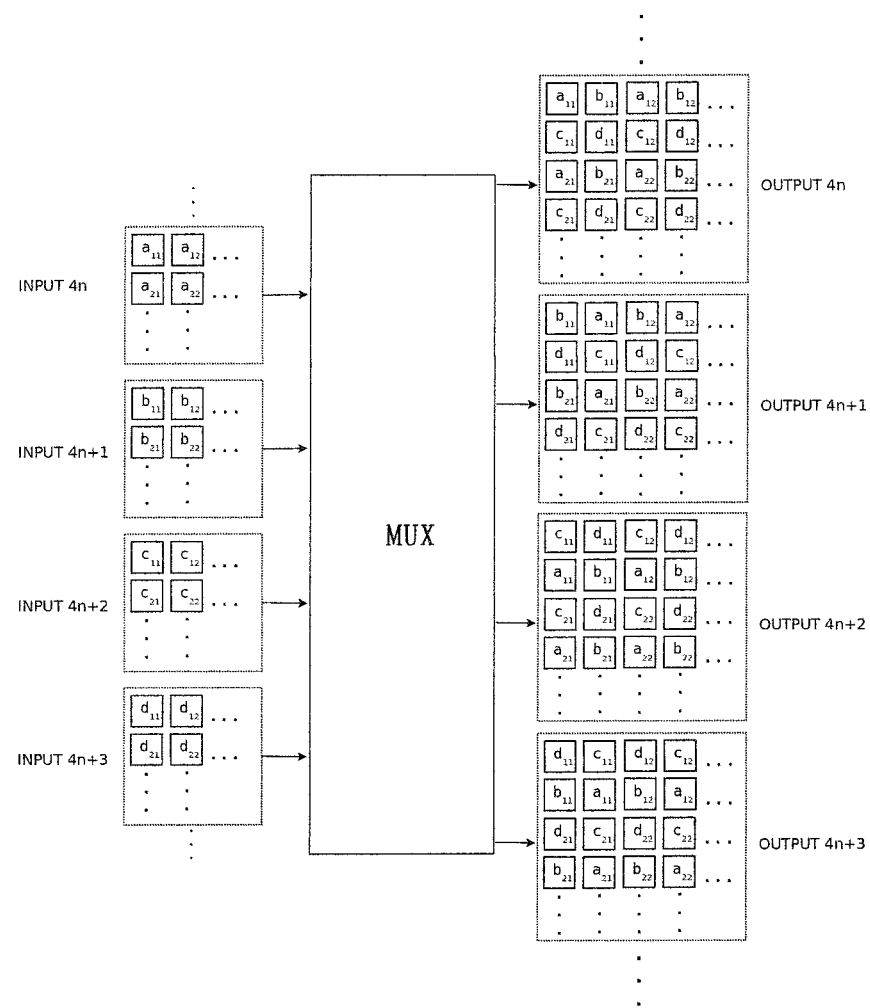
FIG. 5 illustrates a diagram of an MUX layer included in the generative neural network in FIG. 4.

The up-scale layer may be, for example, an MUX layer which may perform pixel interleaving and rearrangement processing on a plurality of input images so as to increase a size of each of images without changing the number of the images. As a result, the MUX layer increases the number of pixels per image by arranging and combining pixels in different images. FIG. 5 illustrates a diagram of up-scale using a 2*2 MUX layer. For four input images INPUT 4n, INPUT 4n+1, INPUT 4n+2, and INPUT 4n+3, assuming that the number of pixels of the input images is a*b, four images OUTPUT 4n, OUTPUT 4n+1, OUTPUT 4n+2 and OUTPUT 4n+3 with 2a*2b pixels are output after pixel rearrangement processing of the 2*2 MUX layer, which increases pixel information per image.

In the image processing method according to the embodiments of the present disclosure, the RGB components in the input image comprise noises which are different from each other. The noises may be random noises such as Gaussian noises, for generating image related detail information during image conversion. Since each time a different noise image is added to the first image, when image processing is performed multiple times using the same group of generative neural networks according to the same first image and different noise images, converted images having different details may be obtained, which enriches the detail information in the converted image, which enriches the detail information in the converted image and provides better user experience. The converted image output by the generative neural network has N components, which are three components, i.e., RGB components in the embodiments of the present disclosure. The generative neural network can realize different image processing through different training processes, for example, image style, scene, season, effect, or other features based image conversion.

Figure 6:
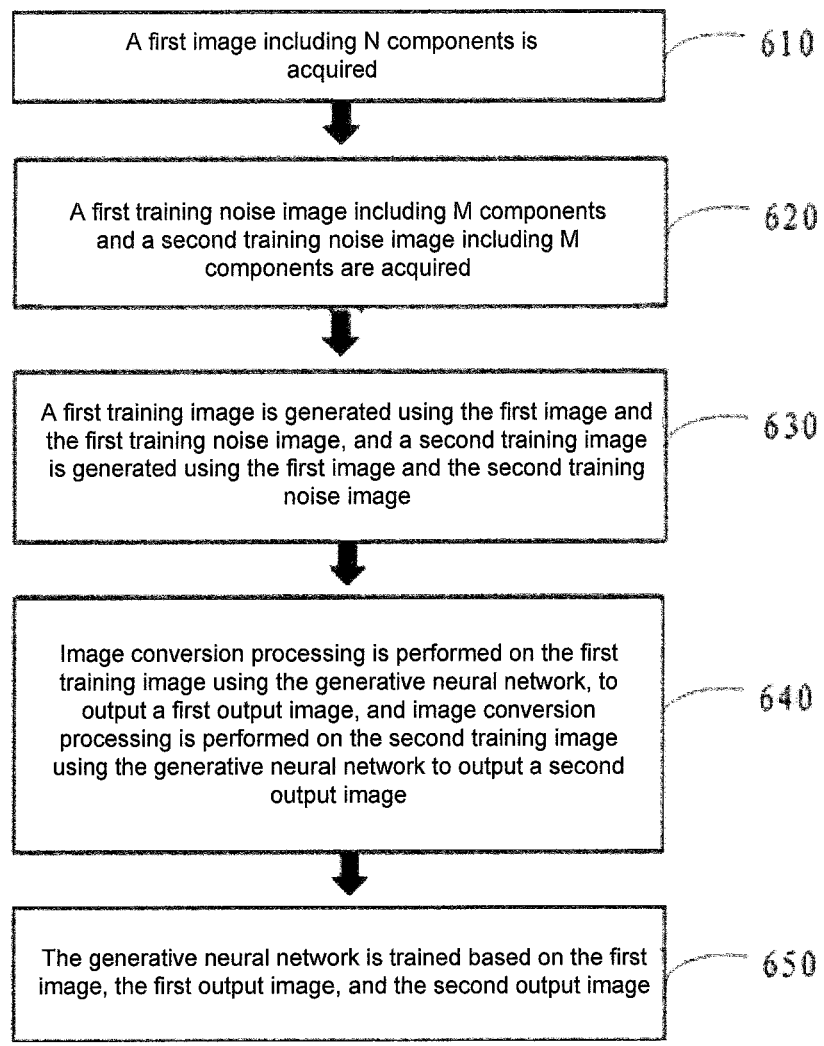
FIG. 6 illustrates a flowchart of training a generative neural network.
Figure 7:
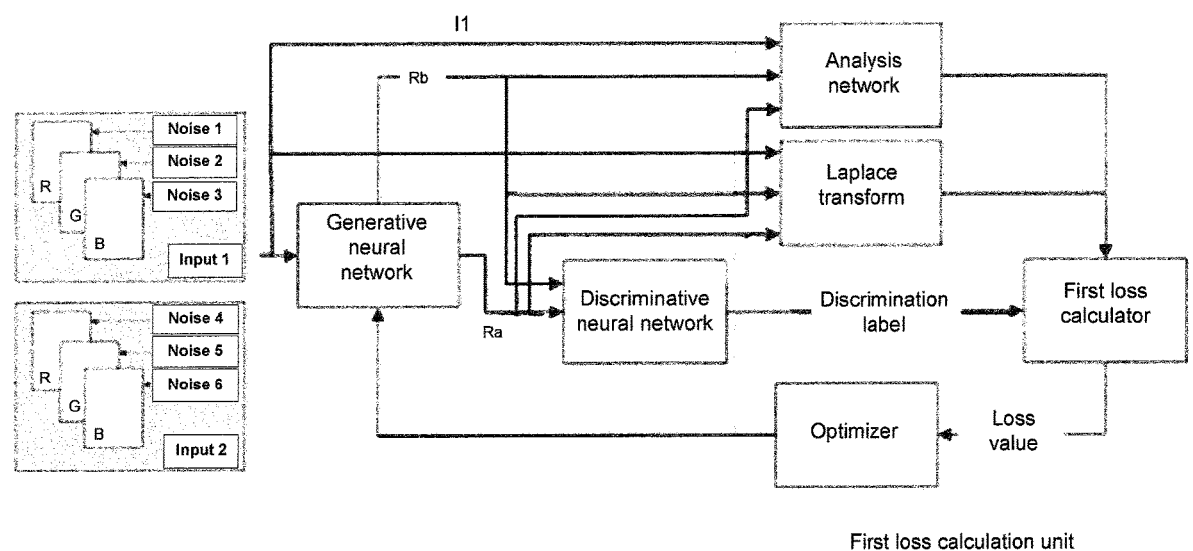
FIG. 7 illustrates a block diagram of training a generative neural network.

FIG. 6 illustrates a flowchart of training the generative neural network, and FIG. 7 illustrates a block diagram of training the generative neural network. A process of training the generative neural network will be described in detail below in conjunction with FIGS. 6 and 7.

As shown in FIG. 6, in step S610, a first image I1 including N components is acquired.

In step S620, a first training noise image including M components and a second training noise image including M components are acquired. For example, in the embodiments of the present disclosure, M is 3. In other embodiments of the present disclosure, M may also be 1, in which case the noise image is directly input to the generative neural network together with the first image, for generating detail information during the image conversion processing. In the embodiments of the present disclosure, for example, the first image I1 has three components, the first training noise image has three components, i.e., a noise image N1, a noise image N2, and a noise image N3, and the second training noise image has three components, i.e., a noise image N4, a noise image N5, and a noise image N6, which are different from each other and are different from the noise images N1, N2, and N3.

Then, in step S630, a first training image T1 is generated using the first image I1 and the first training noise image, and a second training image T2 is generated using the first image I1 and the second training noise image.

In step S640, image conversion processing is performed on the first training image T1 using the generative neural network, to output a first output image Ra, and image conversion processing is performed on the second training image T2 using the generative neural network to output a second output image Rb.

Next, in step S650, the generative neural network is trained based on the first image I1, the first output image Ra, and the second output image Rb.

It can be known that the first training image T1 and the second training image T2 for training the generative neural network are obtained according to the same first image I1 in combination with different noise images, that is, the first training image T1 and the second training image T2 not only have the same image features, but also have different noises for generating image details. The generative neural network is trained in accordance with a loss function according to the image processed results for the first training image T1 and the second training image T2 from the generative neural network, to optimize parameters of the generative neural network, wherein the parameters comprise convolution kernels and biases of convolutional layers in the generative neural network.

The training is intended to optimize parameters in the generative neural network according to processed results of the generative neural network, so that it can accomplish the conversion purposes. The process of training the generative neural network in step S650 comprises: inputting the first output image Ra to a discriminative neural network to output a discrimination label indicating whether the first output image Ra has converted features; calculating a loss value of the generative neural network using a first loss calculation unit according to the first image I1, the first output image Ra, the second output image Rb, and the discrimination label to optimize the parameters of the generative neural network. In the embodiments of the present disclosure, the first output image Ra and the second output image Rb may be input together to the discriminative neural network for outputting discrimination labels respectively to train the generative neural network.

Figure 8:
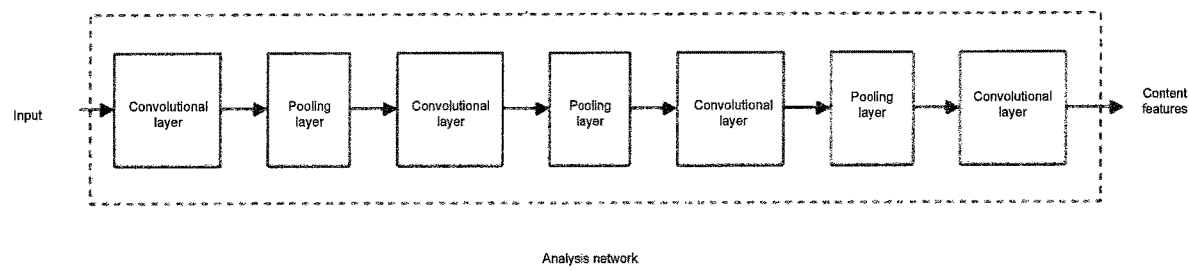
FIG. 8 illustrates a specific structural diagram of an analysis network.

As shown in FIG. 7, the first loss calculation unit may comprise an analysis network, a Laplace transformer, a first loss calculator, and an optimizer. A specific structure of the analysis network is shown in FIG. 8, which consists of a number of convolutional layers and pooling layers for extracting features of an input image. An output from each of the convolutional layers is features extracted from the input image. The pooling layers each are configured to reduce a resolution of feature images and pass it on to a next convolutional layer. Feature images from each convolutional layer characterize features of the input image at different levels (such as a texture, an edge, an object, etc.) In the embodiments of the present disclosure, the first output image Ra and the second output image Rb are processed by using the analysis network, to extract the style features thereof, and the extracted style features are input to the first loss calculator.

The Laplace transformer is configured to perform Laplace transform on the obtained first output image Ra and second output image Rb, and measure a difference between the output images using a difference between Laplace transformed output images, i.e., a Laplace transform loss. In the embodiments of the present disclosure, it is desired that there is a large difference between the first output image Ra and the second output image Rb obtained from the first image I1 to ensure the diversity of the output images. Therefore, the Laplace loss is input to the first loss calculator during training of the generative neural network to instruct the optimizer to optimize the parameters of the generative neural network.

The first loss calculator is configured to calculate, in accordance with a first loss function, the loss value of the generative neural network, according to the style features extracted by the analysis network, the Laplace transform loss output by the Laplace transformer, and the discrimination labels of the first output image Ra and the second output image Rb.

The first loss calculator inputs a calculated total loss value of the generative neural network to an optimizer, which optimizes convolution kernels and biases in the convolutional layers of the generative neural network according to the loss value to achieve a processing effect which is closer to the image conversion purposes.

In the analysis network, an output from each convolutional layer is features of the input image. It is assumed that a certain convolutional layer has $N_l$ convolution kernels, and an output from the convolutional layer comprises $N_l$ feature images, and it is assumed that a size of each feature image is $M_l$ (which is a width x a height of the feature image). Outputs from such l layers may be stored in a matrix $F^l \in R^{N_l \times M_l}$. $F_{ij}^l$ represents a value at a $j^{th}$ position in a feature image output by an $i^{th}$ convolution kernel in a $l^{th}$ layer.

In the embodiments of the present disclosure, a difference between output images is characterized according to a style loss value between the output images Ra and Rb. The first loss function comprises a style loss function for calculating the style loss value of the generative neural network according to the style features of the first output image Ra and the style features of the second output image Rb.

Assuming that $\overset{v}{a}$ and $\overset{v}{x}$ are two inidgus input to the analysis network respectively, and Gram matrixes output at the $l^{th}$ layer are $A^l$ and $G^l$ respectively, a style loss function of $\overset{v}{a}$ and $\overset{v}{x}$ at this layer is:

$$E_l = \frac{1}{4N_l^2 M_l^2 C2} \sum_{i,j} (G_{ij}^l - A_{ij}^l)^2$$

where $E_l$ represents the style loss function, and C2 is a constant, which is used to normalize the result. $N_l$ represents that there are $N_l$ convolution kernels in the $l^{th}$ layer of the analysis network, and then an output from the convolutional layer contains $N_l$ feature images. A size of each feature image is $M_l$ (which is a width×a height of the feature image). The Gram matrixes $A^l$ and $G^l$ are defined as:

$$G_{ij}^l = \sum_k F_{kj}^l F_{ik}^l$$

where $G_{ij}^l$ represents a value at a $j^{th}$ position in a Gram matrix (which is style features of $\overset{v}{x}$) corresponding to an $i^{th}$ convolution kernel in the $j^{th}$ convolutional layer, and then $A_{ij}^l$ represents a value at a $j^{th}$ position in a Gram matrix (which is style features of $\overset{v}{a}$) corresponding to the $i^{th}$ convolution kernel in the $j^{th}$ convolutional layer.

Therefore, if the analysis network extracts the style features of the input image through L convolutional layers, a total style loss function is expressed as:

$$L_{style} = \sum_{l=0}^{L} w_l E_l$$

where $w_l$ is a weight of a style loss of the $j^{th}$ layer relative to the total style loss.

In the embodiments of the present disclosure, the style features may be extracted through a plurality of convolutional layers in the analysis network, or may also be extracted through one convolutional layer in the analysis network, which is not specifically limited herein.

Therefore, a difference between styles of the two output results Ra and Rb is:

$$L_{RaRb} = \frac{1}{2C3} \sum_{l=0}^{L} w_l \frac{1}{4N_l^2 M_l^2} \sum_{i,j} (G_{ij}^l - A_{ij}^l)^2$$

where C3 is a constant which is used to normalize the result.

In order to make the diversity of the output results more obvious, which requires that the style loss between two output results should be as large as possible, the style loss is expressed as:

$$L_{DVST} = \frac{1}{L_{RaRb}}$$

The first loss calculator calculates, in accordance with the above total style loss function $L_{style}$, the style loss value between the output images according to the style features of the first output image Ra and the second output image Rb output by the analysis network to ensure that the output images have a diversity of results.

In the embodiments of the present disclosure, the first loss function further comprises a Laplace transform function for calculating a Laplace transform loss value of the generative neural network according to Laplace transformed results of the first image I1, the first output image Ra and the second output image Rb.

The Laplace transform is defined as follows:

$$\Delta f = \sum_i \frac{\partial^2 f}{\partial x_i^2}$$

A Laplace filter is an approximation of the above equation and is defined as follows:

$$D = \begin{bmatrix} 0 & -1 & 0 \\ -1 & 4 & -1 \\ 0 & -1 & 0 \end{bmatrix}$$

If two images $\overset{\rightarrow}{p}$ and $\overset{\rightarrow}{a}$ are given, a difference value between Laplace transformed values of $\overset{\rightarrow}{p}$ and $\overset{\rightarrow}{a}$ is defined as a Laplace loss, and a Laplace loss function is defined as:

$$L_{Laplacian} = \sum_{i,j} \left( D(\overset{\rightarrow}{p}) - D(\overset{\rightarrow}{x}) \right)_{i,j}^2$$

Laplace loss values $L_{laplacian\_a}$ and $L_{laplacian\_b}$ of the first output image Ra and the second output image Rb which are obtained after processing by the generative neural network with respect to the first training image may be calculated in accordance with the equation of the Laplace loss function according to the feature images output by the first image I1, the first output image Ra and the second output image Rb in the analysis network.

The Laplace loss values of the generative neural network are calculated, which can ensure consistency between the converted image output by the generative neural network and the input image, so that the processed output image has converted features while retaining sufficient original information. In the embodiments of the present disclosure, the generative neural network is trained by using the generative neural network in combination with the Laplace loss between the input image and the output images, to ensure consistency between the converted image and the input image, so that the system is simple and is easy to train.

In the embodiments of the present disclosure, the first loss calculation function further comprises a loss function of a generator:

$$L\_G = E_{x-Pdata(x)}[\log D(x)] + E_{z-Pz(z)}[1-\log D(G(z))]$$

where Pdata is an image set which make the output from the discriminative neural network be 1, Pz is a set of input images of the generative neural network, D is the discriminative neural network, and G is the generative neural network. The first loss calculator calculates an adversarial loss value of the generative neural network according to L_G.

In the embodiments of the present disclosure, the first loss calculation function further comprises a parameter regularization loss function $L_{L1}$. In the neural network, convolution kernels and biases are parameters which are obtained after being trained. The convolution kernels decide what to do with an input image, and the biases determine whether an output from the convolution kernels is input to a next layer. Therefore, in the neural network, the biases may, for example, be "switches", which decide whether the convolution kernels are "on" or "off." For different input images, the network turns on or off different convolution kernels to achieve different processing effects.

A mean of absolute values of all the convolution kernels in the neural network is:

$$W = \frac{\sum \|w\|}{C_w}$$

where $C_w$ is the number of the convolution kernels in the network. A mean of absolute values of all the biases in the neural network is:

$$B = \frac{\sum \|b\|}{C_b}$$

where $C^b$ is the number of the biases in the network. Then the parameter regularization loss function is:

$$L_{L1} = \frac{W}{B + \varepsilon}$$

where $\varepsilon$ is a very small positive number, to ensure that the denominator is not 0.

It is desirable in the embodiments of the present disclosure that a bias in the convolutional layer has a greater absolute value than that of the convolution kernel so as to more effectively exert the effect of a biased "switch." During training, the first loss calculator calculates a parameter regularization loss value of the generative neural network according to $L_{L1}$H.

In summary, a total loss of the generative neural network is:

$$L_{total} = \alpha L_{Laplacian} + \beta L\_G + \chi L_{DVST} + \delta R$$

where R is a normalized loss value of the generative neural network, $\alpha$, $\beta$, $\chi$ and $\delta$ are weights of the Laplace loss value, the adversarial loss value, the style loss value and the normalized loss value relative to the total loss respectively. In the embodiments of the present disclosure, the parameter regularization loss value described above may be used to represent the normalized loss value, but other types of regularization losses may also be used.

The discriminative neural network used in training the generative neural network constitutes a group of adversarial networks together with the generative neural network. In the adversarial networks, the generative neural network is used to convert an input image having an effect A into an output image having an effect B, and the discriminative neural network is used to judge whether the output image has features of the effect B, and output a discrimination label. For example, if it is judged that the output image has the features of the effect B, "1" is output, and if it is judged that the output image does not have the features of the effect B, "0" is output. The generative neural network is gradually generated, so that the discriminative neural network outputs an output image which is "1", and the discriminative neural network can gradually more accurately judge whether the output image has converted features. Both of the generative neural network and the discriminative neural network are trained synchronously and are adverse to each other to obtain better parameters.

Figure 9:
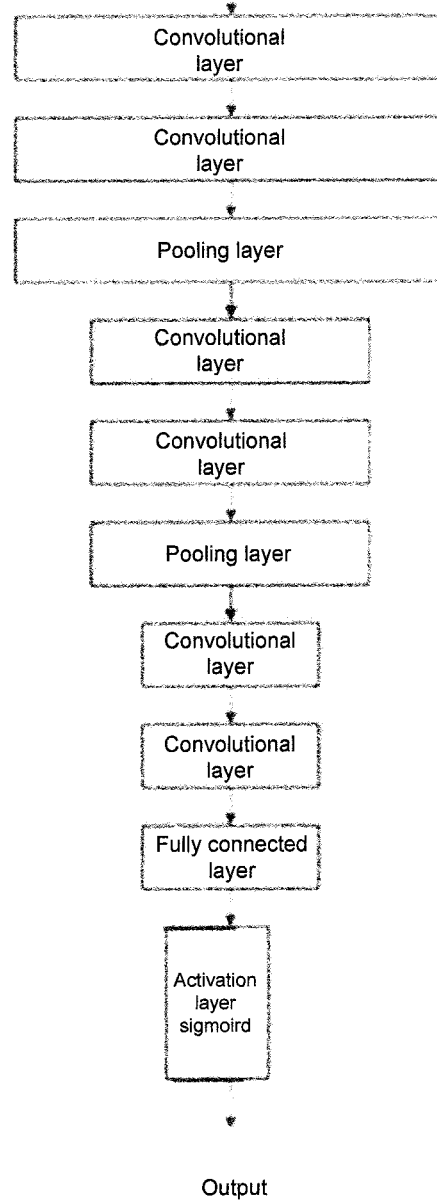
FIG. 9 illustrates a specific structural diagram of a discriminative neural network.

The discriminative neural network extracts the content features of the input image by using a plurality of convolutional layers and pooling layers and reduces a size of feature images for further extraction of image features by a next convolutional layer. The image features are further processed by using a fully connected layer and an activation layer to finally output a scalar value as a discrimination label indicating whether the input image has converted features. The fully connected layer has the same structure as that of the convolutional neural network except that the convolution kernels are replaced by the scalar value. The activation layer is typically a RELU or sigmoid function. In the embodiments of the present disclosure, a specific structure of the discriminative neural network is shown in FIG. 9, in which the activation layer is a sigmoid function, and finally the discrimination label is output.

In the adversarial networks, the generative neural network converts the input image having an effect A into an output image having an effect B, and the discriminative neural network judges whether the output image has features of the effect B, and outputs a discrimination label. For example, if it is judged that the output image has the features of the effect B, the output is close to "1", and if it is judged that the output image does not have the feature of the effect B, "0" is output. The generative neural network is gradually generated through training, so that the discriminative neural network outputs an output image which is "1", and the discriminative neural network can gradually more accurately judge whether the output image has converted features. Both of the generative neural network and the discriminative neural network are trained synchronously and are adverse to each other to obtain better parameters.

Figure 10:
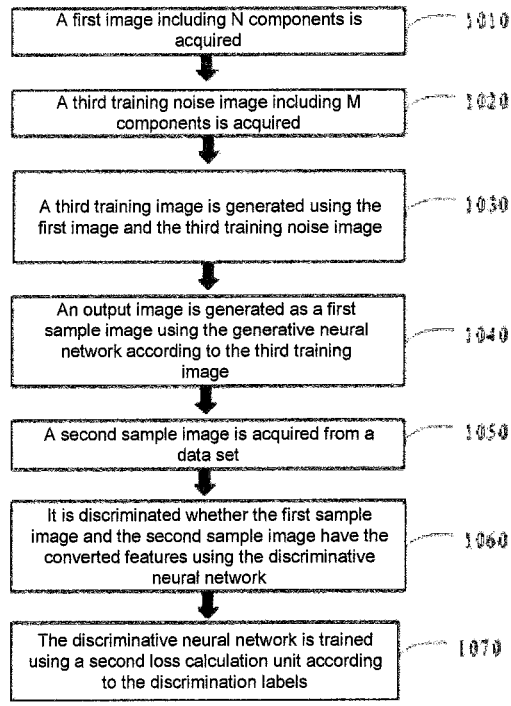
FIG. 10 illustrates a flowchart of training a discriminative neural network.
Figure 11:
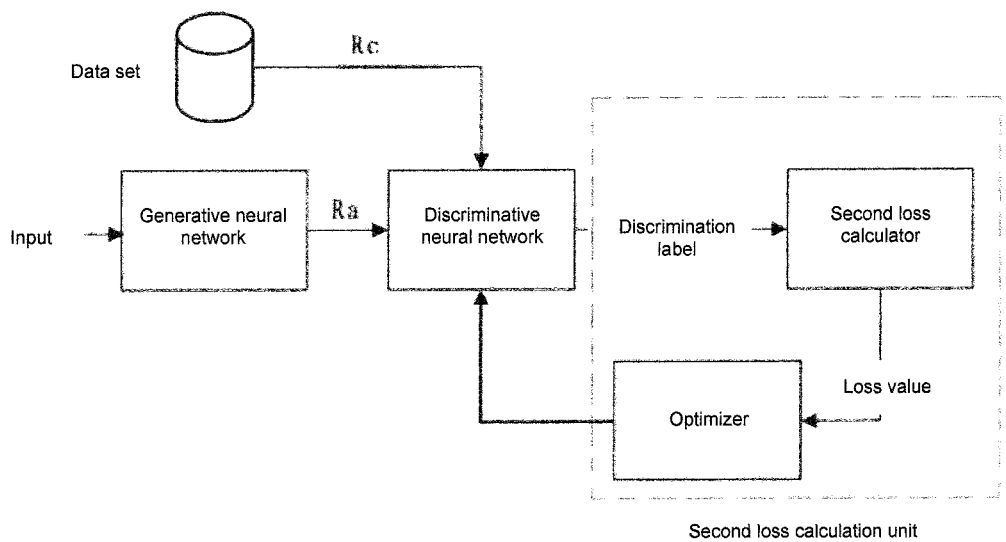
FIG. 11 illustrates a block diagram of training a discriminative neural network.

FIG. 10 illustrates a flowchart of training the discriminative neural network, and FIG. 11 illustrates a block diagram of training the discriminative neural network. A process of training the discriminative neural network will be described in detail below with reference to FIGS. 10 and 11.

As shown in FIG. 10, in step S1010, a first image I1 including N components is acquired.

In step S1020, a third training noise image including M components is acquired. It should be understood that the first training noise image, the second training noise image and the third training noise image in the present specification is not intended to refer to a sequence and a difference, and are only used to represent training noise images in different phases. In fact, the third training noise image may be the first training noise image as described above.

Then, in step S1030, a third training image T3 is generated using the first image I1 and the third training noise image. In a case that the third training noise image is the first training noise image as described above, the third training image T3 here is the same as the first training image T1 as described above.

In step S1040, an output image is generated as a first sample image Ra using the generative neural network according to the third training image T3.

Next, in step S1050, a second sample image Rc is acquired from a data set. The second sample image Rc comprises converted features, and the data set is a pre-established image set which comprises the converted features.

In step S1060, it is discriminated whether the first sample image Ra and the second sample image Rc have the converted features using the discriminative neural network described above, and discrimination labels are output. It should be understood that the second sample image Rc naturally has a "true" label, and the first sample image Ra naturally has a "false" label.

Finally, in step S1070, the discriminative neural network is trained using a second loss calculation unit according to the discrimination labels.

As shown in FIG. 11, the second loss calculation unit comprises a second loss calculator and an optimizer. In the image processing method, training the discriminative neural network using the second loss calculation unit comprises: calculating, in accordance with a second loss function, a loss value of the discriminative neural network using the second loss calculator according to the discrimination label of the first sample image and the discrimination label of the second sample image, wherein the second loss function comprises a discriminative neural network loss function; and optimizing parameters of the discriminative neural network using the optimizer according to the loss value of the discriminative neural network, wherein the parameters comprise convolution kernels and biases of convolutional layers in the discriminative neural network.

The first sample image Ra is an output image which is obtained by converting an effect A into an effect B using the generative neural network, and is equivalent to a "false" sample. The second sample image Rc acquired from the data set is a "true" sample having the effect B. It is judged whether Ra and Rc have the effect B by using the discriminative neural network, to output the discrimination labels.

The second loss calculation function comprises a discriminative neural network loss function:

$$L\_D = -E_{x\sim Pdata(x)}[\log D(x)] - E_{z\sim Pz(z)}[1 - \log D(G(z))]$$

where $P_{data}$ is an image set which makes an output of a discriminative neural network be 1; $P_z$ is a set of input images of an generative neural network; D is the discriminative neural network; and G is the generative neural network. The loss value of the discriminative neural network is calculated by the second loss calculator in accordance with L_D, and the parameters of the discriminative neural network are optimized using the optimizer according to the loss value.

In the image processing method according to the embodiments of the present disclosure, different noise images are added to the three components which are RGB components of the first image to obtain the input image. During image processing, image related detail information may be generated from the noise images, so that there is diversity of the output converted images, that is, for the same input image, there is a difference between the converted results due to the introduction of different noises.

The trained generative neural network has optimized parameters which can be used to implement the intended image conversion processing. In addition, in the present disclosure, the first loss calculation unit is configured to train the generative neural network in combination with style features and a Laplace transform loss, which makes the system simple and easy to train. A style loss function is used to ensure diversity of converted images output by the generative neural network. A Laplace loss function is used to ensure that the output converted image is consistent with the input image. That is, the converted image not only has converted features but also comprises sufficient original image information to avoid a loss in a large amount of original image information during the image processing.

Figure 12:
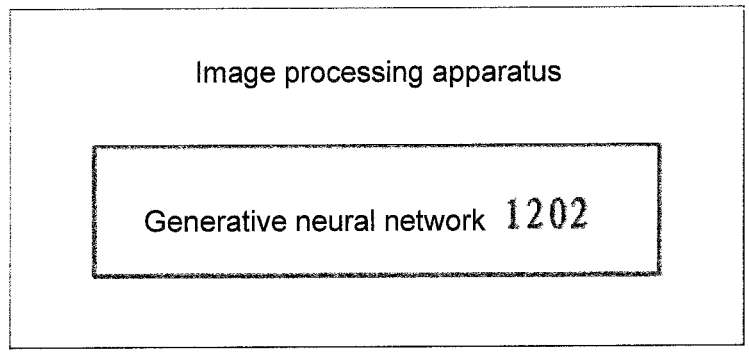
FIG. 12 illustrates a schematic block diagram of an image processing device according to an embodiment of the present disclosure.

The embodiments of the present disclosure further provide an image processing apparatus which can implement the above image processing method. A schematic block diagram of the image processing apparatus is shown in FIG. 12, which comprises a generative neural network 1202. The generative neural network may be the generative neural network described above. The image processing apparatus according to the embodiments of the present disclosure performs image conversion processing on a first image using the generative neural network to output a first output image. In addition, the image processing apparatus may further comprise a training neural network (not shown) for training the generative neural network according to an output image of the generative neural network.

In order to enable diversity of the image converted results, image conversion processing is performed on the first image according to an input image including the first image and a first noise image, wherein the first noise image is used to generate a noise for image related detail information.

The first image comprises N components, where N is a positive integer greater than or equal to 1, and in the embodiments of the present disclosure, N may be, for example, 3. The N components specifically comprise a first color component, a second color component, and a third color component, and in the embodiments of the present disclosure, are RGB components. The first noise image comprises M components, where M is a positive integer greater than or equal to 1, wherein various components of the first noise image are different from each other. For example, in the embodiments of the present disclosure, M is 3, and the three components of the first noise image are added to the RGB components of the first image, respectively to obtain the input image. A diagram of the above acquisition process is shown in FIG. 2.

The generative neural network comprises one or more down-scale units, one or more residual units and one or more up-scale units. The down-scale units each comprise a convolutional layer, a down-scale layer and an instance normalization layer which are sequentially connected. The residual units each comprise a convolutional layer and an instance normalization layer which are sequentially connected. The up-scale units each comprise an up-scale layer, an instance normalization layer and a convolutional layer which are sequentially connected. The number of the up-scale units is equal to the number of the down-scale units.

The image processing apparatus according to the embodiments of the present disclosure further comprises a training neural network configured to train the generative neural network according to the output image of the generative neural network.

In the embodiments of the present disclosure, for example, the first image I1 has three components, the first training noise image has three components, i.e., a noise image N1, a noise image N2, and a noise image N3, and the second training noise image has three components, i.e., a noise image N4, a noise image N5, and a noise image N6, which are different from each other and are different from the noise images N1, N2, and N3.

In the embodiments of the present disclosure, the generative neural network performs image conversion processing on the first training image T1, to output a first output image Ra, and the generative neural network performs image conversion processing on the second training image T2 to output a second output image Rb.

In the embodiments of the present disclosure, the training neural network trains the generative neural network based on the first image I1, the first output image Ra, and the second output image Rb.

Training of the generative neural network is intended to optimize parameters in the generative neural network according to processed results of the generative neural network, so that it can accomplish the conversion purposes. The training neural network comprises a discriminative neural network configured to output a discrimination label indicating whether the first output image Ra has converted features, and a first loss calculation unit configured to calculate a loss value of the generative neural network according to the first image I1, the first output image Ra, the second output image Rb, and the discrimination label, to optimize the parameters of the generative neural network. The first loss calculation unit comprises: an analysis network configured to output style features of the first output image and the second output image; a Laplace transformer configured to obtain Laplace transformed images of the first image, the first output image, and the second output image; a first loss calculator configured to calculate, in accordance with a first loss function, a loss value of the generative neural network, according to the style features extracted by the analysis network, the Laplace transformed results output by the Laplace transformer, and the discrimination label of the first output image; and an optimizer configured to optimize the parameters of the generative neural network according to the loss value of the generative neural network.

The first loss function for calculating the loss value of the generative neural network comprises a style loss function for calculating the style loss value of the generative neural network according to a difference between the style features of the first output image Ra and the style features of the second output image Rb.

The first loss function for calculating the loss value of the generative neural network further comprises a Laplace loss function for calculating a Laplace transform loss value of the generative neural network according to the Laplace transformed results of the first image I1, the first output image Ra, and the second output image Rb.

The discriminative neural network described above is configured to discriminate whether the output image output by the generative neural network has converted features, and may comprise the discriminative neural network described above. In the image processing apparatus according to the embodiments of the present disclosure, the input image is used as a third training image T3, and the output image is used as a first sample image Ra. The image processing method further comprises: acquiring a second sample image Rc from a data set; and discriminating whether the first sample image Ra and the second sample image Rb have converted features and output a discrimination label using the discriminative neural network; and training the discriminative neural network using a second loss calculation unit according to the discrimination label to optimize the parameters of the discriminative neural network. This training is intended to enable the discriminative neural network to output a more accurate discrimination label. The second loss calculation unit comprises a second loss calculator configured to calculate, in accordance with a second loss function, the loss value of the discriminative neural network according to the discrimination label of the first sample image Ra and the discrimination label of the second sample image Rc, wherein the second loss function comprises a loss function of the discriminative neural network; and an optimizer configured to optimize the parameters of the discriminative neural network according to the loss value of the discriminative neural network, wherein the parameters comprise convolution kernels and biases of convolutional layers in the discriminative neural network.

The trained generative neural network can perform image conversion processing according to training to generate an output image which can enable an output of the discriminative neural network to be "1", i.e., the discriminative neural network judges that the output image has converted features. The trained discriminative neural network can more accurately judge, according to the training, whether the output image generated by the generative neural network has converted features.

In the image processing apparatus according to the embodiments of the present disclosure, image conversion processing is performed on the first image according to the input image including the first image and a first noise image. During the image processing, image related detail information may be generated from the noise image, so that there is diversity of the output converted images, that is, for the same input image, there is a difference between the converted results due to the introduction of different noises.

The trained generative neural network has optimized parameters which can be used to implement the intended image conversion processing. In addition, in the present disclosure, the first loss calculation unit is configured to perform training in combination with style features and Laplace transform, which makes the system simple and easy to train. A style loss function is used to ensure diversity of converted images output by the generative neural network. A Laplace loss function is used to ensure that the output converted image is consistent with the input image. That is, the converted image not only has converted features but also comprises sufficient original image information to avoid a loss in a large amount of original image information during the image processing.

Figure 13:
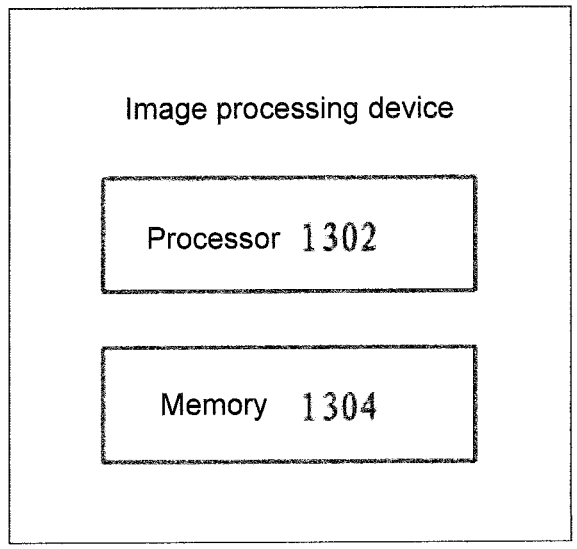
FIG. 13 illustrates a schematic block diagram of an image processing device according to an embodiment of the present disclosure.

The embodiments of the present disclosure further provide an image processing device. A block diagram of the image processing device is shown in FIG. 13, and comprises a processor 1302 and a memory 1304. It should be illustrated that a structure of the image processing device shown in FIG. 13 is only exemplary instead of limiting, and the image processing device may further have other components according to practical application requirements.

In the embodiments of the present disclosure, the processor 1302 and the memory 1304 may communicate with each other directly or indirectly. Components such as the processor 1302 and the memory 1304 etc. may communicate through a network connection. The network may comprise a wireless network, a wired network, and/or any combination of the wireless network and the wired network. The network may comprise a local area network, the Internet, a telecommunication network, an Internet of Things based on the Internet and/or the telecommunication network, and/or any combination of the above networks etc. For example, the wired network may communicate through a transmission manner such as a twisted pair, a coaxial cable or an optical fiber etc. The wireless network may use a communication manner such as a 3G/4G/5G mobile communication network, Bluetooth, Zigbee or WiFi etc. Types and functions of the network may not be limited here in the present disclosure.

The processor 1302 may control other components in the image processing device to perform desired functions. The processor 1302 may be a device having a data processing capability and/or a program execution capability, such as a Central Processing Unit (CPU), a Tensor Processing Unit (TPU) or a Graphics Processing Unit (GPU) etc. The CPU may have X86 or ARM architecture etc. The GPU may be integrated directly onto a motherboard alone or built into a north bridge chip of the motherboard. The GPU may also be built into the CPU as the GPU has a powerful image processing capability.

The memory 1304 may comprise any combination of one or more computer program products, which may comprise various forms of computer-readable storage media, such as a volatile memory and/or a non-volatile memory. The volatile memory may comprise, for example, a Random Access Memory (RAM) and/or a cache etc. The non-volatile memory may comprise, for example, a Read Only Memory (ROM), a hard disk, an Erasable Programmable Read Only Memory (EPROM), a portable Compact Disk Read Only Memory (CD-ROM), a USB memory, a flash memory etc.

One or more computer readable codes or instructions may be stored on the memory 1304, and the processor 1302 may execute the computer instructions to execute the above image processing method. With respect to a detailed description of the processing of the image processing method, reference can be made to a description in the embodiments of the present disclosure related to the image processing method, and details thereof are not described in detail here again. Various application programs and various data, such as image data sets, and various data (such as training data) used and/or generated by the application programs etc. may also be stored in the computer-readable storage medium.

The above description is only specific embodiments of the present disclosure, and the protection scope of the present disclosure is not limited thereto. The protection scope of the present disclosure should be based on the protection scope of the claims.

We claim:

1. An image processing method, comprising:
    acquiring a first image including N components, where N is an integer greater than or equal to 1; and
    performing image conversion processing on the first image using a generative neural network, to output a first output image,
    wherein the generative neural network is trained using a Laplace transform function,
    wherein performing image conversion processing on the first image using a generative neural network comprises:
        performing image conversion processing on the first image using the generative neural network based on an input image including the first image and a first noise image.

2. The image processing method according to claim 1, wherein
    the first noise image comprises M components, where M is an integer greater than or equal to 1.

3. The image processing method according to claim 1, wherein the generative neural network comprises one or more down-scale units, one or more residual units and one or more up-scale units, wherein
    the down-scale units each comprise a convolutional layer, a down-scale layer and an instance normalization layer which are sequentially connected; the residual units each comprise a convolutional layer and an instance normalization layer which are sequentially connected; and the up-scale units each comprise an up-scale layer, an instance normalization layer and a convolutional layer which are sequentially connected, wherein the number of the up-scale units is equal to the number of the down-scale units.

4. The image processing method according to claim 1, wherein the input image is used as a first training image, the first noise image is used as a first training noise image, and the image processing method further comprises:
    acquiring a second training image including information of a second training noise image and the first image, wherein the second training noise image is different from the first training noise image;
    performing image conversion processing on the second training image using the generative neural network to output a second output image; and
    training the generative neural network based on the first image, the first output image and the second output image.

5. The image processing method according to claim 4, wherein training the generative neural network comprises:

inputting the first output image to a discriminative neural network to output a discrimination label indicating whether the first output image has converted features; and calculating a loss value of the generative neural network according to the first image, the first output image, the second output image and the discrimination label to optimize parameters of the generative neural network.

6. The image processing method according to claim 5, wherein calculating a loss value of the generative neural network comprises:

obtaining style features of the first output image and the second output image;

obtaining Laplace transformed images of the first image, the first output image and the second output image;

calculating, in accordance with a first loss function, the loss value of the generative neural network according to the obtained style features, the obtained Laplace transformed images and the discrimination label of the first output image; and optimizing the parameters of the generative neural network according to the loss value of the generative neural network.

7. The image processing method according to claim 6, wherein the first loss function comprises a Laplace transform function, and calculating the loss value of the generative neural network comprises: calculating, in accordance with the Laplace transform function, a Laplace transform loss value of the generative neural network according to the Laplace transformed images of the first image, the first output image and the second output image.

8. The image processing method according to claim 6, wherein the first loss function further comprises a style loss function, and calculating the loss value of the generative neural network comprises: calculating, in accordance with the style loss function, a style loss value of the generative neural network according to the style features of the first output image and the style features of the second output image.

9. An image processing device, comprising:
one or more processors; and
one or more memories connected to the one or more processors and having computer readable codes stored thereon, which when being executed by the one or more processors, cause the one or more processors to be configured to:
perform image conversion processing on a first image including N components using a generative neural network, to output a first output image, where N is an integer greater than or equal to 1,
wherein the generative neural network is trained using a Laplace transform function; and
wherein performing image conversion processing on the first image using a generative neural network comprises:
performing image conversion processing on the first image using the generative neural network based on an input image including the first image and a first noise image,
wherein the first noise image comprises M components, where M is an integer greater than or equal to 1.

10. The image processing device according to claim 9, wherein the generative neural network comprises one or more down-scale units, one or more residual units and one or more up-scale units, wherein the down-scale units each comprise a convolutional layer, a down-scale layer and an instance normalization layer which are sequentially connected; the residual units each comprise a convolutional layer and an instance normalization layer which are sequentially connected; and the up-scale units each comprise an up-scale layer, an instance normalization layer and a convolutional layer which are sequentially connected, wherein the number of the up-scale units is equal to the number of the down-scale units.

11. The image processing device according to claim 9, wherein the processors are further configured to:

train the generative neural network according to the first output image from the generative neural network, wherein the input image is used as a first training image, and the first noise image is used as a first training noise image, the generative neural network further performs image conversion processing on a second training image including information of a second training noise image and the first image to output a second output image, wherein the second training noise image is different from the first training noise image; and the processors are further configured to train the generative neural network based on the first image, the first output image and the second output image.

12. The image processing device according to claim 11, wherein the processors are further configured to:

output a discrimination label indicating whether the first output image has converted features; and calculate a loss value of the generative neural network according to the first image, the first output image, the second output image and the discrimination label to optimize parameters of the generative neural network, wherein optimizing the parameters of the generative neural network comprises:

obtaining style features of the first output image and the second output image;

obtaining Laplace transformed images of the first image, the first output image and the second output image;

calculating, in accordance with a first loss function, the loss value of the generative neural network according to the obtained style features, the obtained Laplace transformed images and the discrimination label of the first output image; and optimizing the parameters of the generative neural network according to the loss value of the generative neural network.

13. The image processing device according to claim 12, wherein the first loss function comprises a Laplace transform function for calculating a Laplace transform loss value of the generative neural network according to the Laplace transformed images of the first image, the first output image and the second output image.

14. The image processing device according to claim 12, wherein the first loss function further comprises a style loss function for calculating a style loss value of the generative neural network according to the style features of the first output image and the style features of the second output image.

* * * * *